US006853383B2

(12) United States Patent
Duquesnois

(10) Patent No.: US 6,853,383 B2
(45) Date of Patent: Feb. 8, 2005

(54) METHOD OF PROCESSING 2D IMAGES MAPPED ON 3D OBJECTS

(75) Inventor: Laurent Michel Olivier Duquesnois, San Mateo, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 168 days.

(21) Appl. No.: 10/059,433

(22) Filed: Jan. 29, 2002

(65) Prior Publication Data

US 2002/0101430 A1 Aug. 1, 2002

(30) Foreign Application Priority Data

Jan. 30, 2001 (FR) .............................................. 01 01237

(51) Int. Cl.[7] ................................................. G09G 5/00
(52) U.S. Cl. ...................... 345/581; 345/582; 345/583; 345/587; 345/419; 345/619
(58) Field of Search ................................ 345/582, 583, 345/587, 419, 619, 581

(56) References Cited

U.S. PATENT DOCUMENTS 5,657,432 A * 8/1997 Matsui ........................ 345/582
5,898,438 A * 4/1999 Stewart et al. ............... 345/419
5,903,270 A * 5/1999 Gentry et al. ................ 345/419
5,923,334 A * 7/1999 Luken .......................... 345/423
6,384,835 B1 * 5/2002 Reiter et al. ................. 345/582
6,437,782 B1 * 8/2002 Pieragostini et al. ........ 345/426

OTHER PUBLICATIONS

VRML 97 "The Virtual Reality Modeling Language 6 Node reference" ISO/IEC 14772–1 1997.

* cited by examiner

Primary Examiner—Matthew C. Bella
Assistant Examiner—Po-Wei Chen

(57) ABSTRACT

A method of processing images in images comprising three-dimensional objects, the method comprising a step of mapping a two-dimensional image on a face of a three-dimensional object, a step of interaction between a user and the two-dimensional image mapped on the three-dimensional image, intended to enable a user to displace the whole or part of the two-dimensional image on the face of the three-dimensional object. This method enables the user to map a fixed 2D image or a video image on a face of a 3D object, and to displace the image as he wishes on the face of the object he has selected. If the image is constituted by several parts, for example, the parts of a puzzle, the user can independently displace each part of this image, for example, so as to reconstitute the initial image of the puzzle.

6 Claims, 7 Drawing Sheets

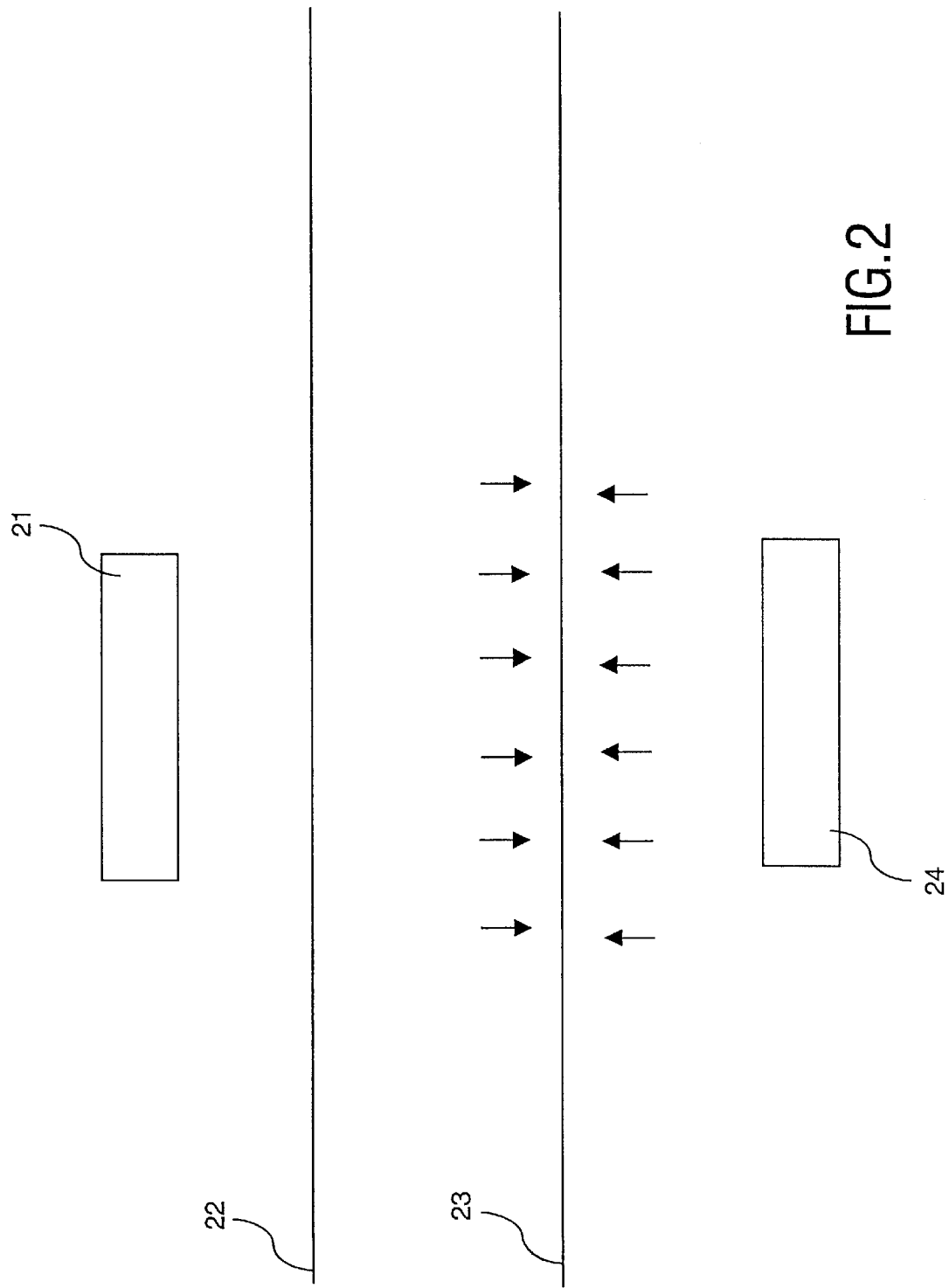

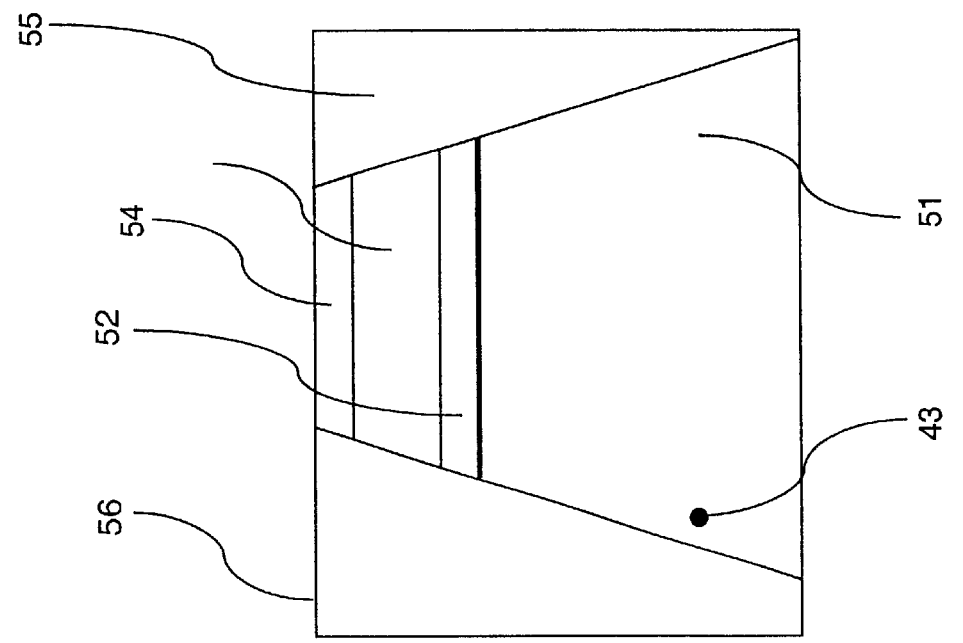
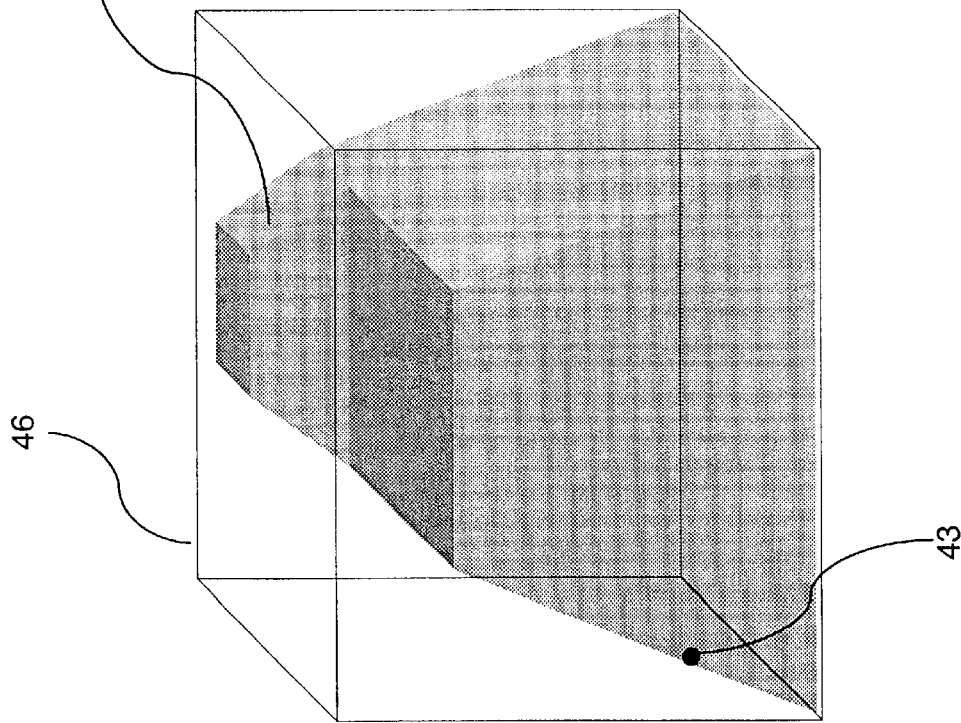
FIG.5

METHOD OF PROCESSING 2D IMAGES MAPPED ON 3D OBJECTS

FIELD OF THE INVENTION

The invention relates to a method of processing images in images comprising objects in three dimensions, said method comprising a step of mapping a two-dimensional image on a face of a three-dimensional object. The invention is used, for example, in the ICT industry, notably in video games.

BACKGROUND OF THE INVENTION

The projection of three-dimensional objects (3D objects hereinafter) on a screen is currently used particularly in the design of video games. Numerous interfaces, referred to as HAL (Hardware Abstraction Layer) allow simplification of this design by realizing interfaces between the software language used for the design and a graphic card allowing projection of 3D images. Some of these interfaces allow the application of a two-dimensional image (2D image hereinafter) on a face of a 3D object. This is called "mapping". For example, it is possible to map a tapestry on the walls of a piece shown in 3D, or a texture on the faces of a 3D cube. Moreover, the development of digital video, for example in the MPEG format, allows interaction between the video world and the 3D world. Thus, certain design languages for 3D images allow future use of videos in these images. This is the case, for example, with the VRML language (Virtual Reality Modeling Language) described in the standard ISO/IEC14772-1: 1997. This language is a scene description language which provides the particular possibility of mapping a video image of the MPEG format on a face of a 3D object. This language also allows mapping of a fixed image on a face of a 3D object. The VRML language describes a scene by way of a tree constituted by different nodes. The scene is described via a text file. A 2D image is mapped on a 3D object by virtue of the "image texture" node and a video mapping is effected by virtue of the "movie texture" node.

OBJECT AND SUMMARY OF THE INVENTION

It is an object of the invention to propose a method allowing interaction between a user and a 2D fixed image or a video image mapped on a face of a 3D object.

According to the invention, a method as described in the opening paragraph is characterized in that the method comprises a step of interaction between a user and the two-dimensional image mapped on the three-dimensional object, said interaction step being intended to enable the user to displace the whole or a part of the two-dimensional image on the face of the three-dimensional object.

The invention takes the following aspects into consideration. When a user maps a 2D fixed image or a video image (the word "image" will hereinafter refer to both a fixed image and a video image) on a face of a 3D object, the image takes the size of this face and it is not possible to interact with the contents resulting from this operation. For example, it could be desirable to displace the image on the face of the 3D object, or to displace a part of this image if it is constituted by several parts.

In accordance with the prior art, it is possible for a user to displace an image in a 2D plane. For example, the MPEG-4 standard authorizes a user to interact with a video object, allowing him to displace the whole or part of this object in the display window of the video object.

The following principle enables a user to displace a 2D image mapped on a 3D object by particularly taking the perspective into account. Each 3D object is included in a 3D box which is the smallest parallelepiped rectangle including the object in question. When the user wishes to select a face of a 3D object, he positions a cursor, whose displacement is controlled by a mouse, on said face and clicks on the mouse. An imaginary radius between a viewing point and the position where the user has clicked enables to determine which box (thus which object) and which face of this box the user wishes to select. By virtue of projections of the faces of the 3D object on the face of the selected box, it is possible to know the face of the object which the user wishes to select, as well as the point of this face which the user wishes to select. This point may correspond to the position of the face on which the 2D image or a part of this image is mapped. For example, in the case of a MPEG-4 video image, this point may correspond to the location of a part of the video image in the display window. The problem is to know the co-ordinates of this point in the display window, i.e. in 2D. Knowing the co-ordinates in 3D of the face of the 3D object as well as the co-ordinates in 3D of the point of the face of the 3D object selected by the user, a conversion of the coordinates based on a barycenter computation allows the 2D co-ordinates of this point to be known in a 2D plane corresponding, for example, to the display window. Once the 2D coordinates of this point are known, the problem comes down to a 2D problem which has been solved in the prior art. When the user displaces this point, for example, by means of the cursor controlled by the mouse, the point is first displaced in a 2D plane, for example, the display window towards another point in this 2D plane. As the 2D co-ordinates of this other point are known, a conversion of the co-ordinates of the same type as described above allows the 3D co-ordinates of this other point to be known. By virtue of the mouse, the user can thus displace the point which he has selected as desired on the face of the 3D object, thus displacing the image or the part of the image which he has selected.

This method has the advantage that it allows a more flexible mapping of the 2D image on the faces of a 3D object. Indeed, the user can place the image in the desired position on the face of a 3D object and displace this image as he wishes on this face by simply using, for example, a mouse connected to his computer. This method may be interesting for the designer in that he can, for example, create a puzzle on a face of a 3D object which is either stationary or moving. Indeed, a puzzle in 2D is an assembly of several parts of an image. In a first period of time, the image is cut up into several parts which are distributed in a random manner on a gaming area, which may be the screen of the computer or a window on this screen. The user should subsequently displace each piece in order to reconstitute the initial image, in which a piece can be displaced by positioning a cursor on the piece and controlling the displacement of this cursor by means of a mouse connected to the computer. By virtue of the method according to the invention, the gaming area may be a face of a 3D object. It should be noted that such a puzzle may comprise several parts of a video image in the MPEG-4 format. However, this method has multiple uses and is not limited to the design of a puzzle on a face of a 3D object.

BRIEF DESCRIPTION OF THE DRAWINGS

The invention and additional characteristic features which may be used to advantage for carrying the invention into effect will hereinafter be described in greater detail with reference to the following Figures.

FIG. 2 illustrates an example of a structure allowing the design of a 3D environment;

FIG. 5 illustrates a technique allowing selection of a face of a 3D object;

DESCRIPTION OF PREFERRED EMBODIMENTS

Figure 1:
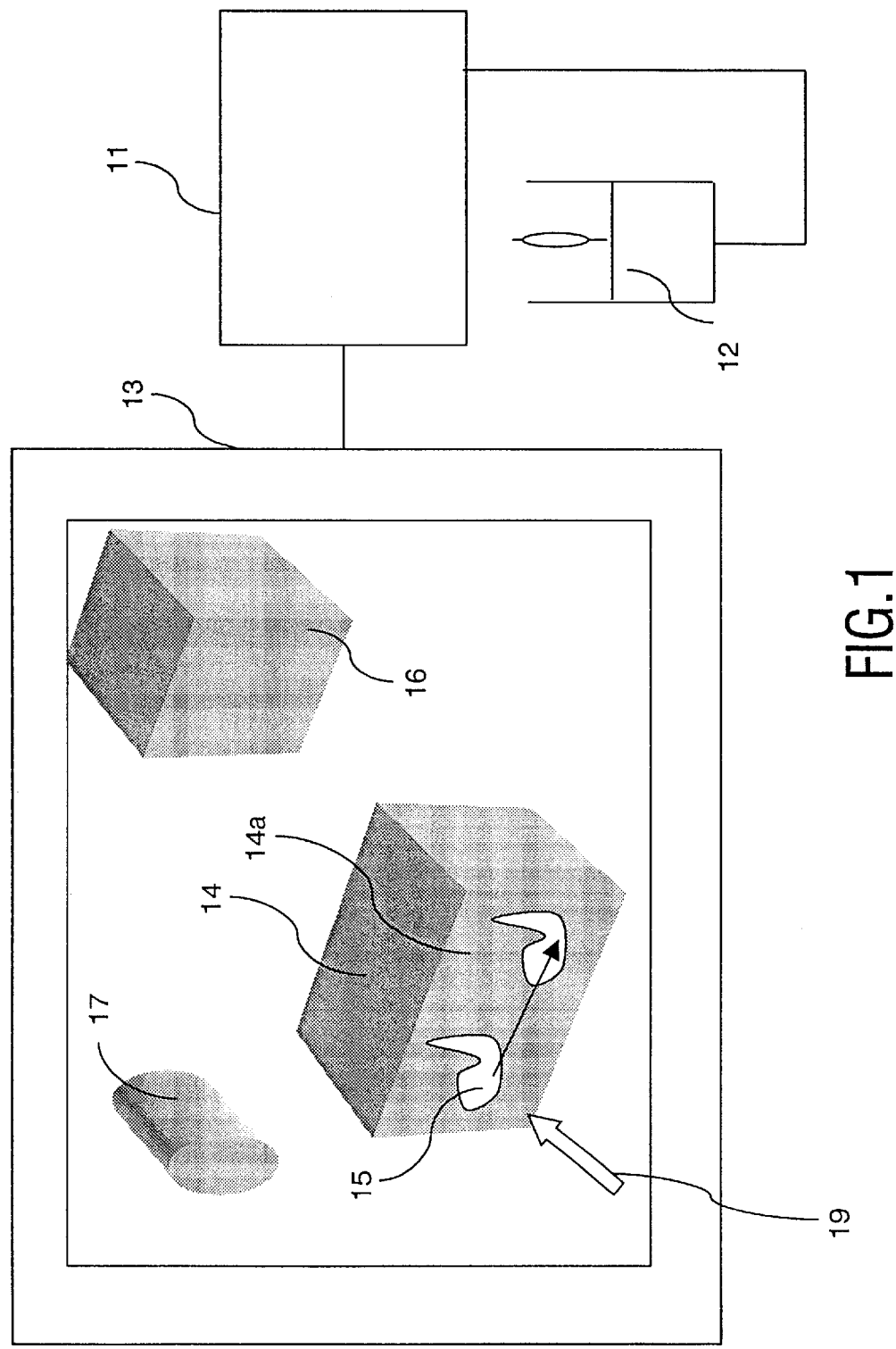
FIG. 1 is a diagram illustrating the characteristic features of the invention.

FIG. 1 illustrates the characteristic features of the invention. A system with which the method according to the invention is carried out comprises a central computer unit 11, a mouse 12 controlling a cursor 19, a computer screen 13 displaying 3D objects such as a parallelepiped 14 on whose faces 2D images such as an image 15 can be mapped.

The illustrated example applies to 3D objects such as a cylinder 17, a cube 16 or the parallelepiped 14. In this example, the image 15 is mapped on one of the faces 14a of the parallelepiped 14. In the case of the puzzle, the image 15 may be a piece of the puzzle. When the user wishes to displace this image 15, he uses the mouse 12 which is connected to the central computer unit 11 so as to displace the cursor 19 to the position of the first image 15 on the computer screen 13. The user then clicks on one of the keys of the mouse 12 so as to select the image 15. The user may then displace this image 15 by means of the mouse 12 so as to place it in another position of the face 14a of the parallelepiped 14. In the case of the puzzle, the face 14a of the parallelepiped 14 may represent the gaming area and the object of the game is to displace each piece mapped on the face 14a so as to reconstitute the initial image of the puzzle. It should be noted that the mouse 12 may be replaced by numerous control devices such as, for example, a handle, a pistol or a user's finger; in the latter example, the computer screen 13 is a touch screen.

FIG. 2 illustrates a structure allowing design of a 3D environment. The example illustrated applies to a design in the VRML language. The structure comprises software 21, a VRML interface 22, a HAL interface 23 and a graphic card 24.

The HAL interface 23, for example OpenGL, provides the possibility of realizing the connection between the language used for creating the software 21 and the graphic card 24. The HAL interface 23 is a 3D graphic library, i.e. based on the layout of primitive 3D graphics, camera position, light, images to be mapped on the surfaces of 3D objects and other information of this type, it changes, for example, the marks, the perspective projection on the screen or eliminates parts concealed by 3D objects. Subsequently, it addresses the graphic card 24 so as to give it the elements required for display of the 3D objects. Consequently, the HAL interface 23 allows 3D environments to be designed without taking the graphic card 24 into account, the only imperative being the compatibility between the language used for the design, i.e. here VRML, and the HAL interface 23. The VRML interface 22 ensures this compatibility by transforming the VRML language, which is a textual language, into a language which is comprehensible to the HAL interface 23, for example, the C++ language. Similarly, the graphic card 24 may be designed without taking the software language describing the 3D environments which it must display into account, the only imperative being the compatibility between the language used for the graphic card 24 and the HAL interface 23.

Figure 3A:
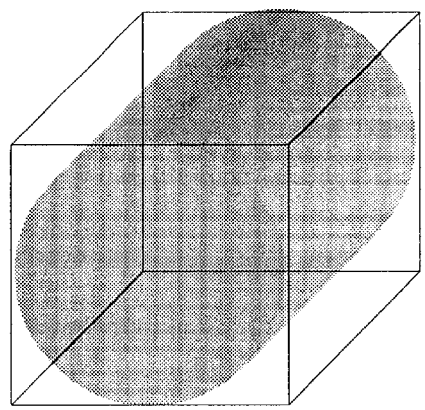
FIGS. 3a, 3b and 3c illustrate examples of parallelepiped boxes (bounding boxes) comprising 3D objects.
Figure 3B:
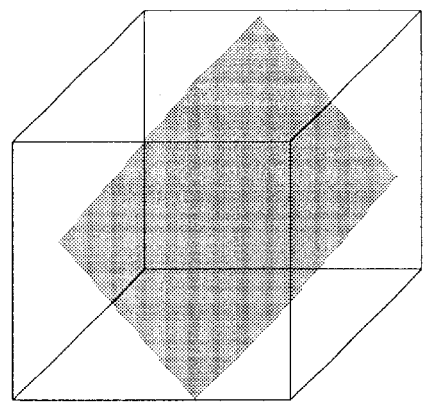
Figure 3C:
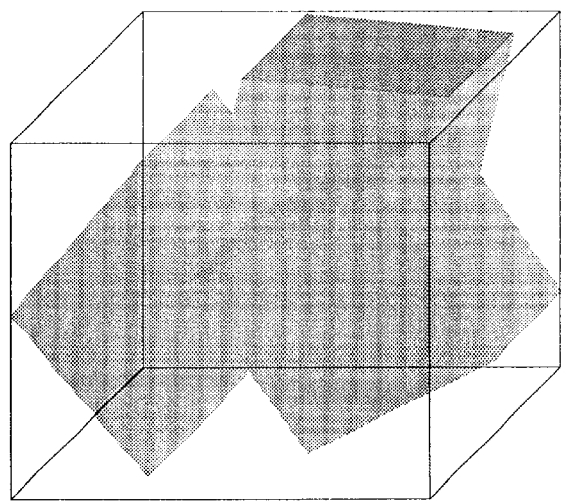

FIGS. 3a, 3b and 3c illustrate examples of bounding boxes comprising 3D objects.

FIG. 3a shows a bounding box comprising a cylinder. The height and width of this box are equal to the diameter of the cylinder and its length is equal to the length of the cylinder. FIG. 3b shows a bounding box comprising a parallelepiped which is not rectangular. The height of this box is equal to the diagonal of one of the faces of the non-rectangular parallelepiped and the width is equal to the other diagonal of this face and its length is equal to the length of the non-rectangular parallelepiped. FIG. 3c shows a bounding box comprising a complex object. The dimensions of this box are computed as a function of the dimensions of the complex object so as to limit its size to a maximum. It should be noted that, for a cube, the bounding box comprising this cube merges with this cube. This is the same for a parallelepiped rectangle.

Figure 4:
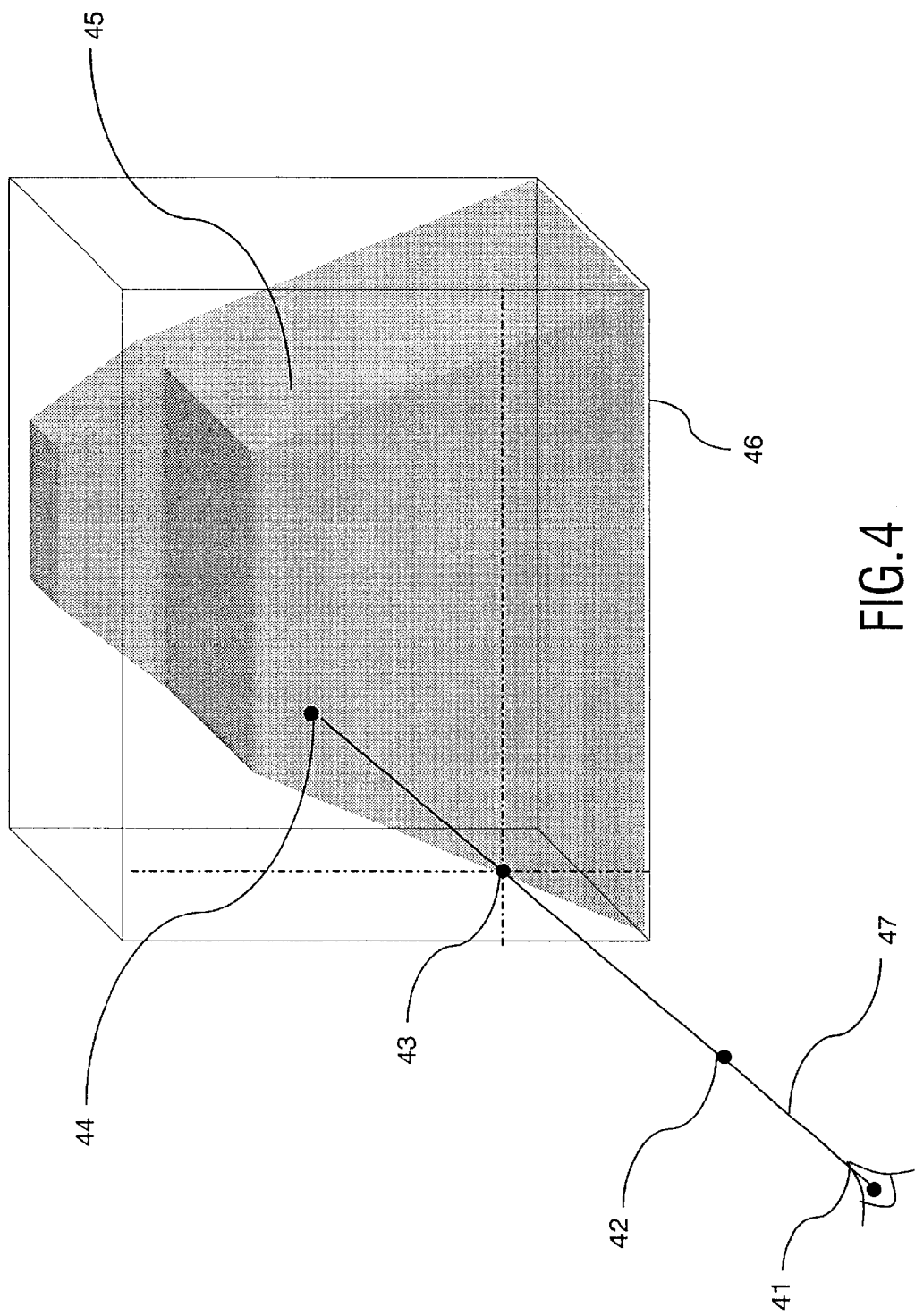
FIG. 4 illustrates a technique allowing selection of a face of a bounding box comprising a 3D object.

FIG. 4 illustrates a technique allowing selection of a face of a bounding box comprising a 3D object. The example illustrated applies to a bounding box 46 comprising an object 45.

When the user wishes to select one of the faces of the object 45, the first step consists of selecting a face of the bounding box 46. The user clicks on a point 42 on the computer screen 13, i.e. when the cursor 19 is located at this point 42, the user presses one of the keys on the mouse 12. An imaginary radius 47 is then computed, which connects an also imaginary viewing point 41 and the point 42 on the screen. The viewing point is a point situated outside the computer screen 13, which is fixed and may correspond, for example, to the middle of a user's face sitting in front of the computer screen 13. The point of intersection of this imaginary radius 47 with the first encountered bounding box comprising a 3D object is subsequently computed. In this example, the first encountered bounding box is the bounding box 46 comprising the object 45. A point of intersection 43 is then obtained. It should be noted that the imaginary radius generally has two points of intersection with one bounding box comprising a 3D object. The retained point of intersection will be that one which is situated nearest to the computer screen 13. The selected face of the bounding box 46 is then the face comprising the point of intersection 43. The point of intersection of the selected face of the object 45 with the imaginary radius 47 is a selected point 44. The determination of the selected face of the object 45 will be described in greater detail with reference to FIG. 5.

FIG. 5 illustrates a technique allowing selection of a face of a 3D object. The example illustrated here applies to the selection of a face of the object 45, in which the selected face of the bounding box 46 and the point of intersection 43 are known.

The following principle allows selection of a face of the object 45. The object 45 is projected on the selected face of the bounding box 46 for obtaining a projection 56. This projection comprises five sectors enumerated 51 to 55 corresponding to faces or parts of faces of the object 45. The sector comprising the point of intersection 43 is retained, i.e. the sector 51 in the example illustrated here. The selected face of the object 45 is thus the face to which the sector 51 in the projection 56 corresponds. The techniques illustrated by FIGS. 4 and 5 thus provide the possibility that, based on the point 42 on the computer screen 13 selected by the user, the 3D co-ordinates of the face of the object which this user wishes to select are known. These techniques also provide the possibility of knowing the 3D coordinates of the selected point 44, which is the point of intersection between the imaginary radius and the face of the object which the user wishes to select. In the case of, for example, the puzzle, the selected point 44 may correspond to the location of one of the pieces of the puzzle and the selected face of the object may correspond to the gaming area. When the user wishes to displace the piece situated on the selected point 44 so as to place it in another position of the selected face, he clicks on the selected point 44 by means of the mouse 12 and holds the click while displacing the mouse. To render this action possible, it should be known how the piece is displaced in the gaming area, i.e. in a 2D environment when the user displaces it in the 3D environment. The co-ordinates must thus be converted so as to know, for example, the co-ordinates of the selected point 44 in the gaming area. This conversion of co-ordinates will be described in greater detail with reference to FIG. 6.

Figure 6:
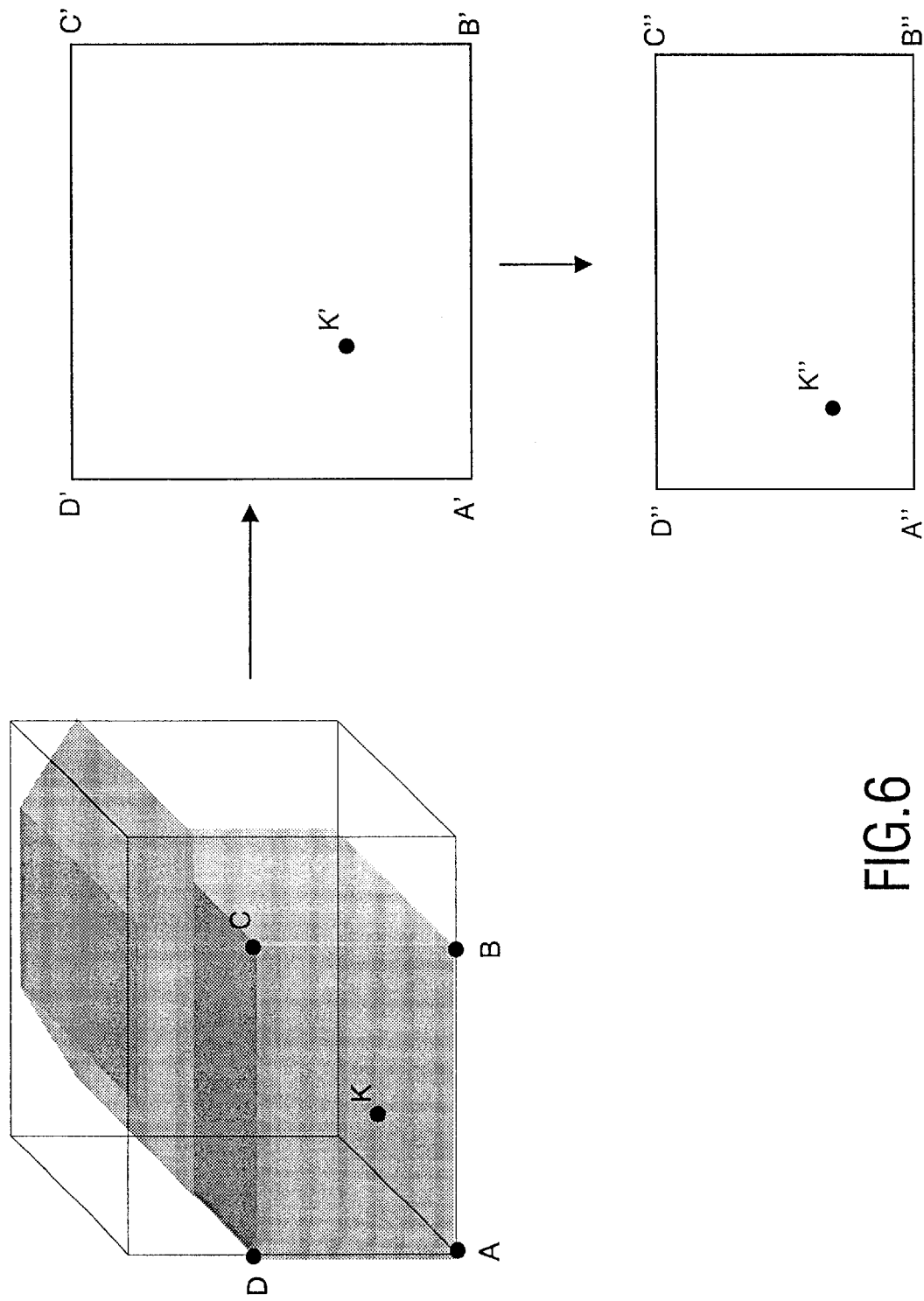
FIG. 6 illustrates an example of converting 3D co-ordinates into 2D coordinates.

FIG. 6 illustrates an example of converting 3D co-ordinates into 2D coordinates. The example applies to a first point K pertaining to a face having 4 apexes A, B, C and D (ABCD face) of a 3D object. In the example considered, the ABCD face has a rectangular shape, but the method illustrated below similarly applies to, for example, the selected point 44 of the selected face of the object 45 having an arbitrary shape. The object of the method illustrated here is to convert the 3D co-ordinates of the first point K into 2D coordinates of a third point K" in a plane A"B"C"D" corresponding, for example, to the gaming area in the case of a puzzle or to the display window in the case of a video image.

The first step is to convert the 3D co-ordinates of the first point K into 2D coordinates of a second point K' in a reference frame A'B'C'D', which is a square reference frame 1, i.e. A' has co-ordinates $(0,0)$, B'$(1,0)$, C'$(1,1)$ and D'$(0,1)$. To this end, the weights $\alpha$, $\beta$, $\gamma$ and $\delta$ are computed with which K would be the barycenter of A, B, C and D by virtue of the vectorial relation which is valid for each point M of the ABCD face, where MA designates the MA vector and where the sum $(\alpha+\beta+\gamma+\delta)$ is different from zero:

$$\alpha MA+\beta MB+\gamma MC+\delta MD=(\alpha+\beta+\gamma+\delta)MK$$

The solution of this equation is found, on the one hand, by projecting this vectorial relation on an arbitrary vector since this vector is neither orthogonal to the ABCD plane nor included in this ABCD plane, with which 3 algebraic equations can be obtained while, on the other hand, a fourth algebraic equation is obtained by choosing the point O as a particular point M having $(0,0,0)$ as 3D co-ordinates, which means that $\alpha+\beta+\gamma+\delta=1$. The weights $\alpha$, $\beta$, $\gamma$ and $\delta$ are computed by solving the system of 4 equations to 4 unknowns. The point K' is barycenter of the points A', B', C' and D' with associated coefficients $\alpha$, $\beta$, $\gamma$ and $\delta$. Subsequently one determines the similarity with which the A"B"C"D" plane can be obtained from the reference frame A'B'C'D' and this similarity is applied to point K' in order to obtain the 2D co-ordinates of point K". Since the point and the face of the 3D object which the user wishes to select are thus known, the point corresponding to this selected point in a corresponding plane, for example, the gaming area in the case of a puzzle or the display window in the case of a video image is known. The user can thus displace the selected point on the selected face by means of the mouse 12 or another control device. It should be noted that this action will be possible even if the 3D objects are in motion and the techniques described with reference to FIGS. 4 to 6 will be the same in this case.

Figure 7:
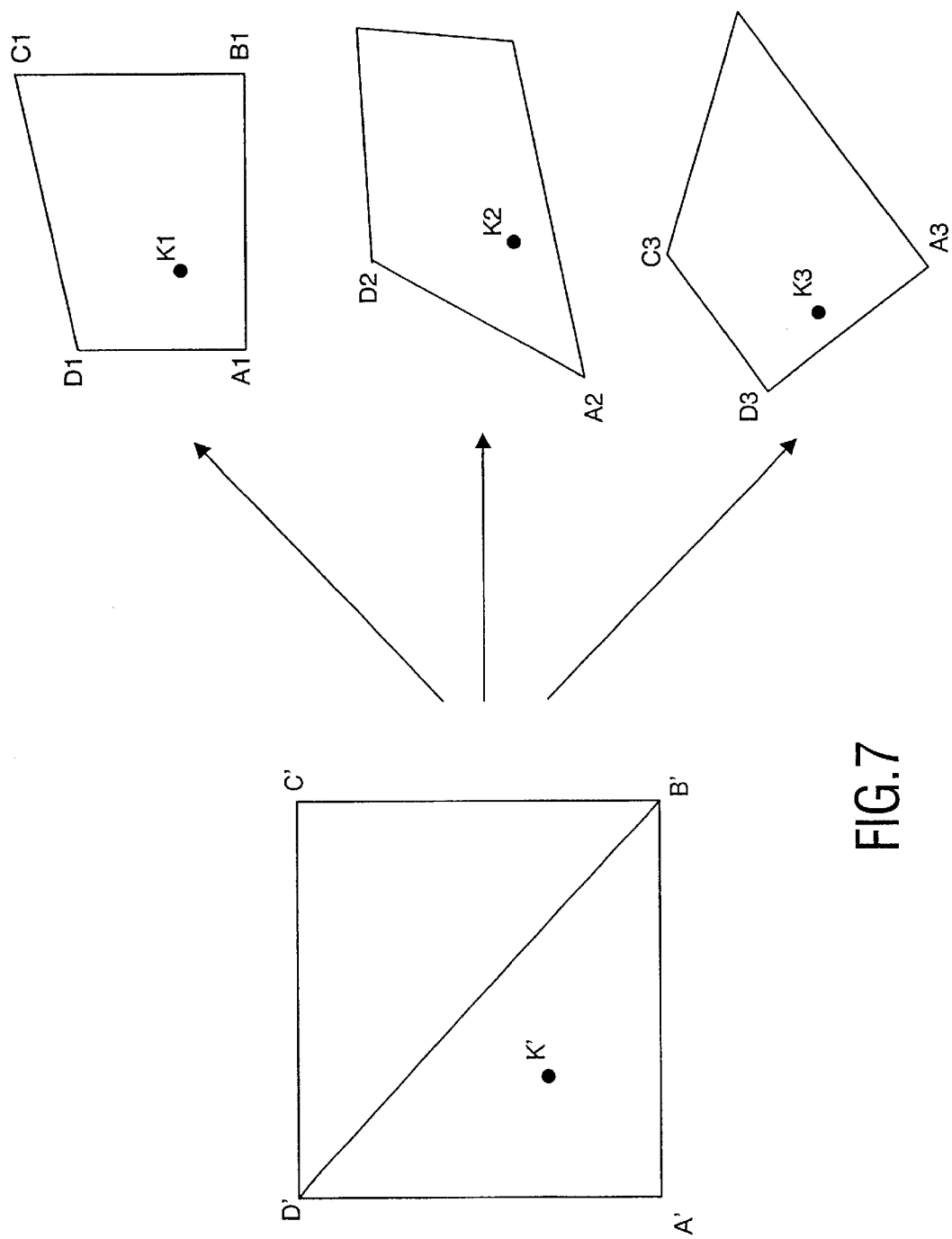
FIG. 7 illustrates examples of transforming the shape of an image before it is mapped on a face of the 3D object.

FIG. 7 illustrates examples of transforming the shape of an image before it is mapped on a face of a 3D object. Certain software languages, for example VRML, allow deformation of the shape of the image which one wants to map on a face of a 3D object. For example, in the case of the puzzle one could deform the gaming area or, in the case of a video image, one could deform the display window. This is effected by deforming the reference frame A'B'C'D'. FIG. 7 shows three examples transforming the reference frame A'B'C'D', a first example leading to a first transformed reference frame A1B1C1D1, a second example leading to a second transformed reference frame A2B2C2D2, a third example leading to a third transformed reference frame A3B3C3D3. When the point K' has been determined, a supplementary step is necessary before computing co-ordinates of the point K". In the case of the first transformation, one computes the co-ordinates of a first transformed point K1 before applying the similarity to this point with which the plane A"B"C"D" can be obtained from the reference frame A'B'C'D' in order to obtain the co-ordinates of the point K". The co-ordinates of the point K1 are computed as follows. The reference xM is the abscissa of a point M and yM is the ordinate of this point M. If the point K' is situated in a triangle formed by the points A', B' and D', as is the case in the example illustrated here, the following formulas are applied:

$$xK1=xK'*(xB1-xA1)+(1-yK')*xA1+yK'*xD1$$

$$yK1=yK'*(yD1-yA1)+(1-xK')*yA1+xK'*yB1$$

If the point K' is situated in a triangle formed by the points B', C' and D', the following formulas are applied:

$$xK1=1-((1-xK')*(xC1-xD1)+yK'*(1-xC1)+(1-yK')*(1-xB1))$$

$$yK1=1-((1-yK')*(xC1-xB1)+xK'*(1-yC1)+(1-xK')*(1-yD1))$$

The co-ordinates of a second transformed point K2 in the case of the second transformation and co-ordinates of a third transformed point K3 in the case of the third transformation are computed in the same manner as the co-ordinates of the transformed point K1.

The description above with reference to the Figures illustrates rather than limits the invention. In this respect, several remarks are made below.

FIGS. 2 to 7 apply to the example of the VRML language. The invention may also be used for other languages for describing the 3D environment as soon as these languages provide the possibility of mapping 2D fixed images or video images on faces of 3D objects.

The example of the puzzle used in the description of the Figures is one possibility of using the invention. It will be evident that the invention is not limited to this example but that it applies to all forms of mapping 2D elements on 3D elements.

In principle, it is possible to implement the method according to the invention by means of a data processing device, for example, a suitably programmed computer circuit. A set of instructions comprised in a programming memory may cause the computer circuit to perform the different operations described hereinbefore. The set of instructions may be loaded into the programming memory by reading a data carrier such as, for example a disc comprising the set of instructions. The reading operation may be performed by means of a communication network, for example, the Internet. In this case, a service provider will put the set of instructions at the disposal of those interested.

What is claimed is:

1. A method of processing images in images comprising objects in three dimensions, said method comprising a step of mapping a two-dimensional image on a face of a three-dimensional object, characterized in that the method comprises a step of interaction between a user and the two-dimensional image mapped on the three-dimensional object, said interaction step being intended to enable the user to displace the whole or a part of the two-dimensional image on the face of the three-dimensional object, said interaction step including the sub-steps of: determining the smallest parallelepiped rectangle comprising the three-dimensional object, determining the face of said parallelepiped selected by the user, determining the face and the point of the three-dimensional object, selected by the user from the selected face of the parallelepiped, converting co-ordinates in three dimensions of the selected point of the three-dimensional object into co-ordinates in two dimensions, displacing the selected point of the three-dimensional object in a two-dimensional plane.

2. A method of processing images as claimed in claim 1, characterized in that the sub-step of converting three-dimensional co-ordinates of the selected point of the three-dimensional object into two-dimensional co-ordinates is intended to determine the two-dimensional co-ordinates from the computation of the weights at which the selected point of the three-dimensional object is the barycenter of the apexes of the selected face of the three-dimensional object by applying the weights thus computed to the apexes of the two-dimensional image.

3. A method of processing images as claimed in claim 1, characterized in that said sub-step of determining the face of said parallelepiped selected by the user is intended to determine this face on the basis of an imaginary radius between a given viewing point and a user-selected spot on a screen, allowing the display of images comprising the three-dimensional objects.

4. A method of processing images as claimed in claim 3, characterized in that said sub-step of determining the face and the point of the three-dimensional object selected by the user is intended to project faces of the three-dimensional object on the selected face of said parallelepiped, the selected face of the three-dimensional object being that one whose projection comprises the point of intersection between the imaginary radius and the selected face of said parallelepiped, the selected point of the three-dimensional object being the point of intersection between the imaginary radius and the selected face of the three-dimensional object.

5. A method of processing images as claimed in claim 1, characterized in that said interaction step is effected by means of a cursor whose displacement is controlled by a mouse, the user clicking on the two-dimensional image to be displaced so as to select said image and displacing the cursor so as to displace the selected image.

6. A computer program product for a data processing device, the computer program product comprising a set of instructions which, once loaded into the data processing device, cause said device to perform the steps of the method as claimed in claim 1.

* * * * *